(12) United States Patent
Wiggins et al.

(10) Patent No.: US 8,388,290 B2
(45) Date of Patent: *Mar. 5, 2013

(54) MOUNTING SYSTEM AND METHOD

(76) Inventors: Matthew Wiggins, Mayfield Heights, OH (US); Curtis Taylor, Chagrin Falls, OH (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/640,596

(22) Filed: Dec. 17, 2009

(65) Prior Publication Data

US 2011/0150601 A1   Jun. 23, 2011

(51) Int. Cl.
*F16B 21/00* (2006.01)
(52) U.S. Cl. .................... 411/344; 411/342
(58) Field of Classification Search ........... 411/340–346
See application file for complete search history.

(56) References Cited

U.S. PATENT DOCUMENTS

| | | | | |
|---|---|---|---|---|
| 1,052,731 | A | * | 2/1913 | Law ........................ 411/340 |
| 1,521,025 | A | * | 12/1924 | Hubener ................... 411/344 |
| 1,521,026 | A | * | 12/1924 | Hubener ................... 411/344 |
| 1,876,237 | A | | 9/1932 | Jackson et al. |
| 2,159,454 | A | * | 5/1939 | Shoup ...................... 411/555 |
| 2,203,146 | A | * | 6/1940 | Hexdall .................... 411/344 |
| 2,567,372 | A | * | 9/1951 | Gelpcke ................... 411/342 |
| 3,762,068 | A | | 10/1973 | Clay |
| 4,714,366 | A | * | 12/1987 | Boudrot .................... 402/13 |
| 6,213,701 | B1 | * | 4/2001 | Ukai ........................ 411/345 |
| 7,828,501 | B2 | * | 11/2010 | Bauer et al. ............... 411/344 |
| 2009/0103999 | A1 | * | 4/2009 | Fucito ...................... 411/342 |

OTHER PUBLICATIONS

U.S. Appl. No. 13/103,919 Office Action, mailed Feb. 28, 2012.

* cited by examiner

*Primary Examiner* — Flemming Saether
(74) *Attorney, Agent, or Firm* — Kunzler Law Group, PC

(57) ABSTRACT

A mounting system, comprising an insertion component configured to be partially inserted into but not through a hole in a first panel of a wall assembly with an elongated anchor having a hub and at least one anchor tab. An elastic holding member is configured to connect the insertion component and the anchor and the anchor located on a first side of a first panel is configured to be inserted through the insertion component opening defining the hole in the first panel. The holding member pulls the insertion component and the anchor toward each other when the insertion component and the anchor are located on opposite sides of the first panel and separated by approximately a first panel thickness.

13 Claims, 9 Drawing Sheets

MOUNTING SYSTEM AND METHOD

FIELD OF INVENTION

The present invention relates generally to a mounting system and method for securing articles to a wall. More particularly the wall mounting system and method involve inserting an elongated anchor through an insertion component opening defining a hole in a first panel of a wall assembly. The anchor and an insertion member are non-fixedly attached to and retained by opposing ends of at least one elastic holding member. The anchor is retained on a first panel inside surface, wherein insertion component is retained by a first panel outside surface, to form the wall anchor system to hold a structural member to a wall.

BACKGROUND OF THE INVENTION

Walls are frequently constructed by attaching drywall panels to studs. For example, structures attached to wall mounting systems that are attached to drywall (i.e., located away from studs or joists) are dependent on the mounting system attached only to the drywall to support both static loads (e.g., an ornamental object) and dynamic loads (e.g., an individual holding a grab bar). If the wall mounting system is weak, for example, the ornamental object can fall or the individual can lose their balance if the mounting system gives way.

In addition, it is important that the structural component located on the inner side of the drywall be large enough to distribute the load over a wide surface area to increase the load bearing capacity of the drywall panel. Conventional fasteners, such as screws and bolts, are not effective when used with drywall unless they are inserted through the drywall into studs or joists.

Although there are anchors that provide larger load carrying capabilities they have inherent limitations such as difficulty to install. One such published application; U.S. Patent Application No. 2007/0272812 (Bauer, et al) has some advantages over other prior art but still has numerous disadvantages and limitations as a wall mounting system. For example, there is often fiberglass insulation on the inside of a typical stud wall. Therefore, when a hole is made in a drywall panel to mount a wall anchor assembly the components inserted through the hole will often encounter fiberglass. When a guide sleeve 24 is inserted through the wall opening as in U.S. Patent Application No. 2007/0272812 (Bauer, et al) two (2) arms 102 and 104 depending from the flange 100 can encounter fiberglass which can make the guide sleeve 24 either inoperable or difficult to work in communication with a mounting mechanism 20.

A further limitation of U.S. Patent Application No. 2007/0272812 (Bauer, et al) is that mounting mechanism 20 is held/restrained inside the wall assembly at only one point by a tab member 26 and in the event that the mounting mechanism 20 becomes disengaged from the tab member 26, the mounting mechanism 20 can fall and be lost inside the wall assembly. In addition, another disadvantage of U.S. Patent Application No. 2007/0272812 (Bauer, et al) is that when the insertion member 22 via actuation of the tab member 26 is positioned adjacent to and parallel with the panel P 1 (FIG. 15) it is difficult or nearly impossible to remove the insertion member 22 without damaging the insertion member 22 or the guide sleeve 24. In addition, the tab member 26 does not stay with the insertion member 22; therefore even if an operator wants to attempt to remove the insertion member 22 at a later time he/she may not be able to locate the tab member 26. This could result in having to buy another wall mounting kit.

Yet another disadvantage of U.S. Patent Application No. 2007/0272812 (Bauer, et al) is that the insertion member 22 installation through the hole is a two hand operation. One hand has to hold or pull on the tab member 26 while another hand has to be used to push the insertion member 22 through the hole.

Consequently, there is a need for a wall mounting system for attaching articles to drywall panels, for example of conventional walls that provides but is not limited to a large load bearing capacity, that requires only one hand to insert the anchor, that provides dual points of connection between the anchor and an insertion component and that overcomes the obstacles involved with fiberglass located inside the wall assembly.

SUMMARY OF THE INVENTION

The present invention and the described embodiments overcome the limitations of the prior art. Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

In accordance with one embodiment of the invention, a system and method is disclosed to simply and easily build and/or install a wall anchor system.

In accordance with another embodiment of the present invention, a system that requires only one hand to securely insert and retain the anchor of a wall anchor system.

In accordance with yet another embodiment of the present invention, a system is disclosed that provides dual points of connection between an anchor and an insertion component.

It is yet a further object of the invention to provide a large load bearing capacity for the anchor.

In accordance with yet another embodiment of the present invention, a system is disclosed that is simpler to install than other large load bearing capacity wall anchor systems.

These and other objects and advantages of the present invention will be apparent to those of skill in the art from the description which follows.

DETAILED DESCRIPTION OF THE INVENTION

Figure 1:
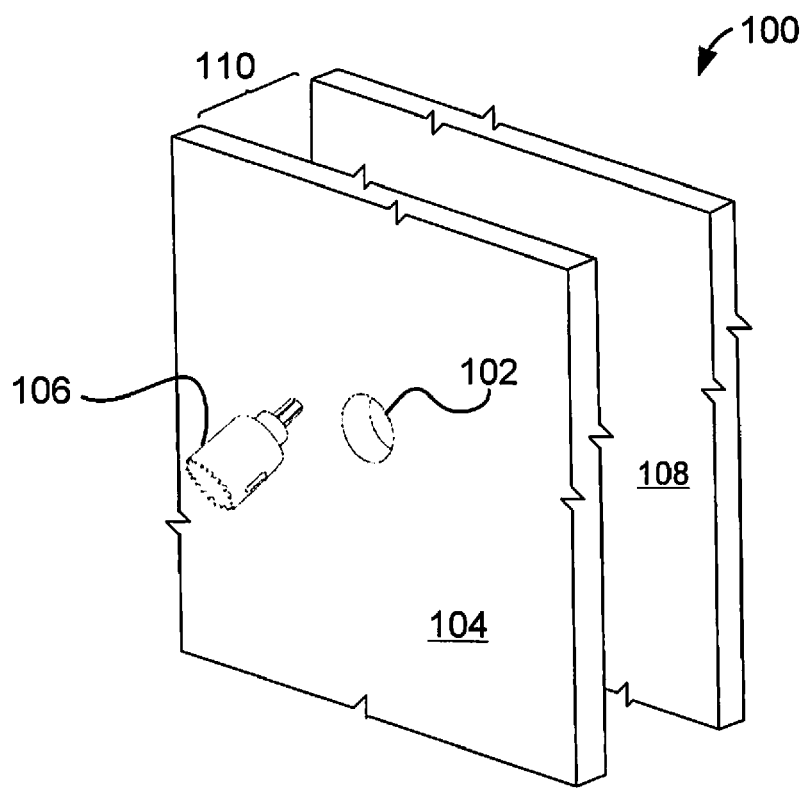
FIG. 1 is a perspective view of a through hole made in a dry wall first panel of a wall assembly according to one exemplary embodiment of the present invention.

One or more implementations of the present invention will now be described with reference to the attached drawings, wherein like reference numerals are used to refer to like elements throughout. The invention relates to a wall mounting system and associated method wherein an anchor, holding member and insertion component are utilized along with additional hardware to hang various devices such as grab bars, hand rails and the like.

Figure 2:
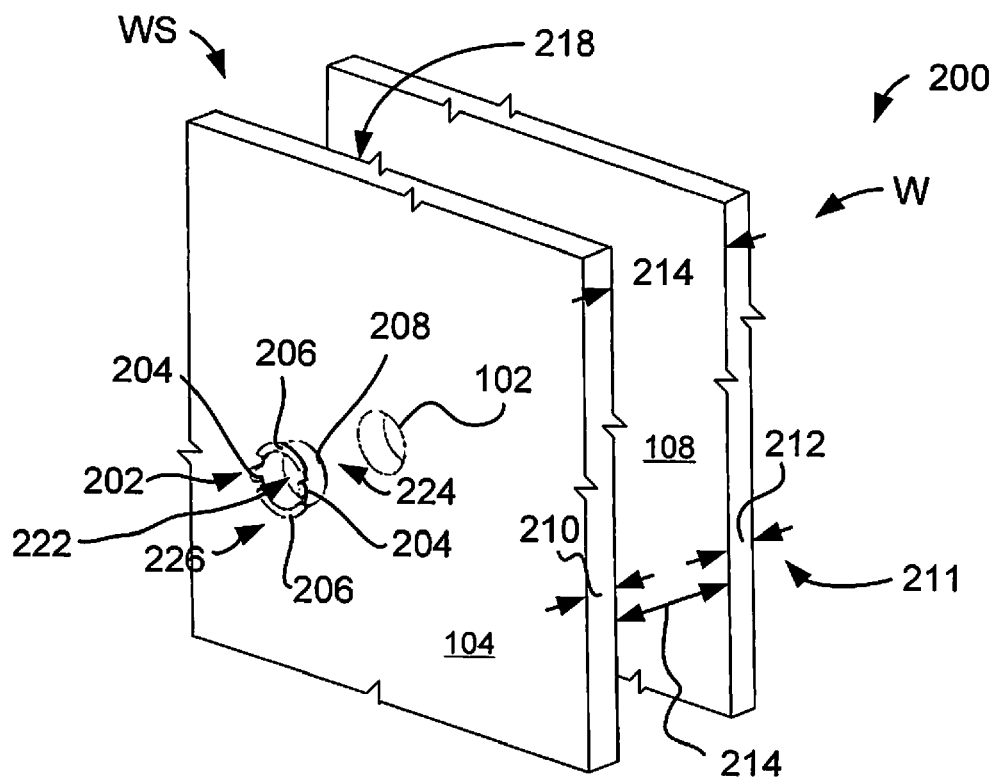
FIG. 2 is a perspective view of an insertion component prior to placement of the insertion component into a through hole according to another embodiment of the invention.
Figure 3:
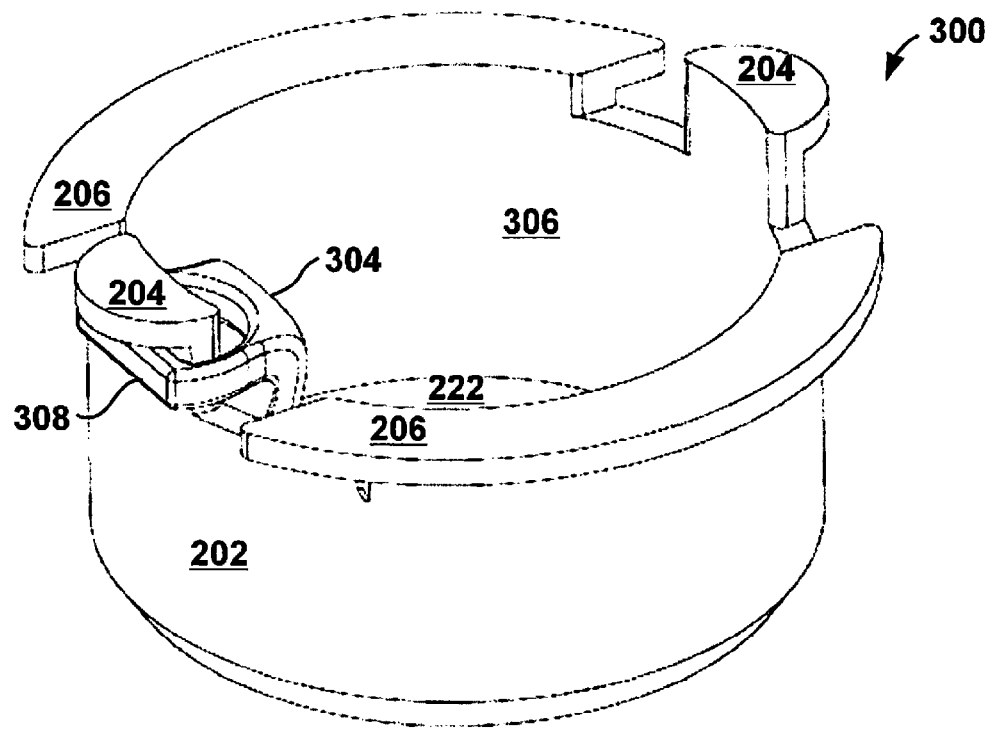
FIG. 3 is a perspective view of an insertion component with a non-fixedly attached holding member in accordance with yet another exemplary embodiment of the invention.

One embodiment of a mounting system of the present invention is illustrated in FIGS. 1-3. In order to install the mounting system in a wall assembly 100 a through hole 102 is drilled into the wall assembly first wall panel 104 using a 1¼ inch core drill bit 106, for example. In this embodiment, for example the wall assembly 100 comprises an drywall panel acting as the first wall panel 104, a second wall panel 108, wherein the first wall panel 104 can be for example, tile faced drywall and the second wall panel 108 can be drywall and the first wall panel 104 and the second wall panel 108 are separated by studs and/or fiberglass, for example to form a wall inner space 106.

FIG. 2 illustrates an insertion component 202 that can be inserted into the through hole 102 until an at least one wall stop flange 206 (illustrated as two wall stop flange segments) of the insertion component 202 comes into contact with the tile outer surface 104 (FIG. 1), for example a wall thickness 211 can be approximately about 4 inches (i.e., the width of a 2×4 stud) plus a width 210 and 212 of the drywall panels (P1 and P2), respectively. Even though the studs are described as 2×4, the system 100 will work with various size studs (e.g., 2×6). The insertion component 202 comprises a leading end 224 and a trailing end 226.

The mounting system of the present invention provides increased load carrying capability over other conventional fasteners/fastener systems, for example screws, toggle bolts, etc. when not attaching to studs but rather drywall. The mounting system can be utilized, for example for towel bars, grab bars, hand rails and the like. The attachment of a mounting plate using the mounting system allows attachment of systems requiring large load bearing capacities. For example, an article such as a grab bar or hand rail can be attached to a wall W using the mounting system. In the embodiment illustrated in FIG. 2 the wall W comprises a first panel 104 of first thickness 210 and a second panel 108 of second thickness 212 separated from each other by studs (not shown) of a wall inner width 214 and insulation (not shown). The grab bar can serve as a handhold support, such as a stainless steel tube assembly providing support for users in slippery environments such as bathtubs and showers.

FIG. 2 illustrates the insertion component 202 which comprises at least one insertion component tab 204, at least one wall stop flange 206, an insertion flange 208 that defines a through hole 102 opening and an insertion opening. When the insertion flange 208 is inserted into the hole 102, the at least one wall stop flange 206 prevents further insertion when the at least one wall stop flange 206 comes into contact with the first panel 104. The insertion flange 208 directs the movement of the insertion component 202 relative to the hole 102.

Figure 4:
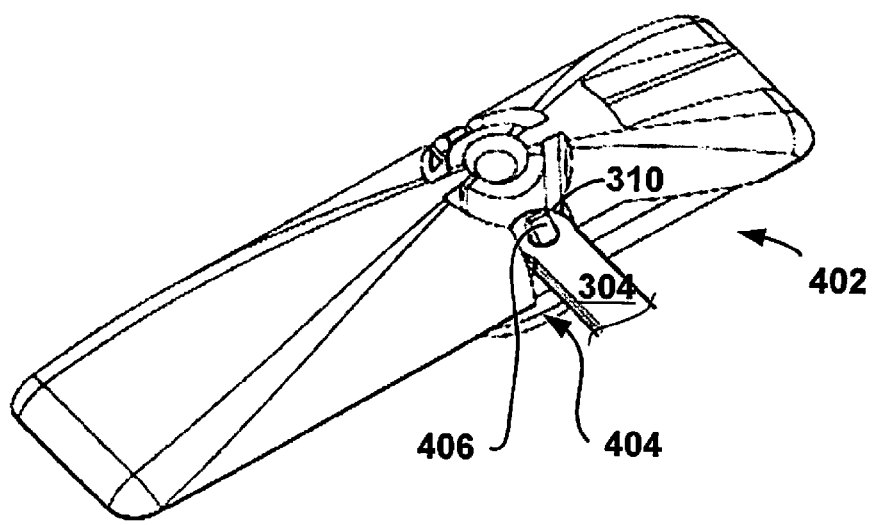
FIG. 4 is a perspective view of at least one holding member non-fixedly attached to an anchor according to another embodiment of the invention.

FIGS. 3 and 4 illustrate that an insertion component 202 and an anchor 402 (FIG. 4) that can cooperate with one another through at least one holding member 304 (FIG. 3) made of an elastomeric material to provide hands free attachment and/or force exertion between the insertion component 202 and the anchor 402 utilizing the at least one holding member 304. An at least one holding member first end opening 308, for example is attached to the at least one insertion component tab 204. At least one holding member second end opening 310, for example is attached to the at least one anchor tab 406. As such, the insertion component 202 and the anchor 402 are configured so that they are in constant elastic communication with each other and the anchor 402 can be inserted though an insertion component opening 306 all the way through the hole 102 into a wall space WS so that an anchor planar face 510 (FIG. 5) can be rotated toward a first panel inside surface 218 and a hub 404 can be placed at approximately about the center of the hole 102 and/or insertion component opening 222. The inventor recognized that by using the insertion component 202 that did not pass all the way through the hole 102 that the insertion component 202 would not come into contact with fiberglass and would not negatively interact with the fiberglass (not shown) between the first panel 104 and the second panel 108. In yet other embodiment, the insertion component 202 can pass through the hole 102 and enter the wall space WS.

In contrast to the present invention, for example as mentioned supra the guide sleeve (or base member) generally indicated by the numeral 24 in U.S. Patent Application No. 2007/0272812 (Bauer et al.) can adversely interfere with fiberglass located between panels P 1 and P 2. The guide sleeve 24 in U.S. Patent Application No. 2007/0272812 (Bauer et al.) includes a flange 100 and two (2) arms 102, wherein the two arms 102 can be spread apart by fiberglass being compressed and forced between the two arms creating an outward force, for example. This interference, for example can cause a substantial increase in time to install the wall anchor system of U.S. Patent Application No. 2007/0272812 (Bauer et al.).

Figure 5:
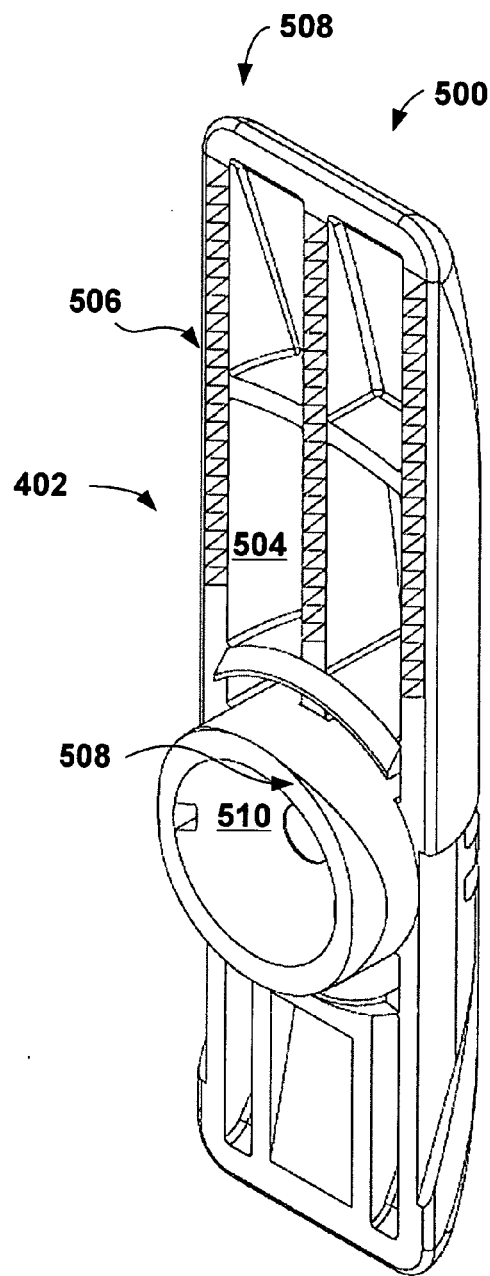
FIG. 5 is perspective view of an anchor planar face according to yet another aspect of the present invention.
Figure 6:
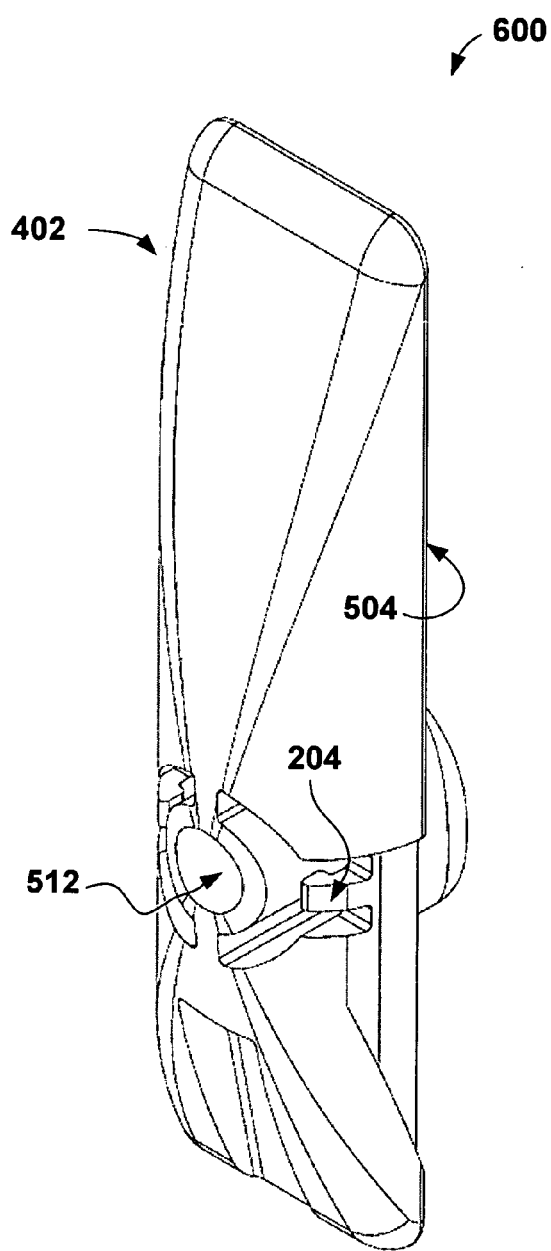
FIG. 6 is a perspective view of an anchor back according to another embodiment of the invention.

FIGS. 5 and 6 illustrate perspective views 500 and 600 of the anchor 402 discussed previously. As illustrated in FIG. 5, another embodiment of an anchor 502 comprises an anchor planar face 504, teeth 506 configured to embed into a mounting wall, a hub 508 with a conical surface 510 for guiding a wall anchor system threaded fastener, for example. The anchor 502, in addition can have a co-molded metal threaded insert for receiving the wall anchor system threaded fastener, for example.

Figure 7:
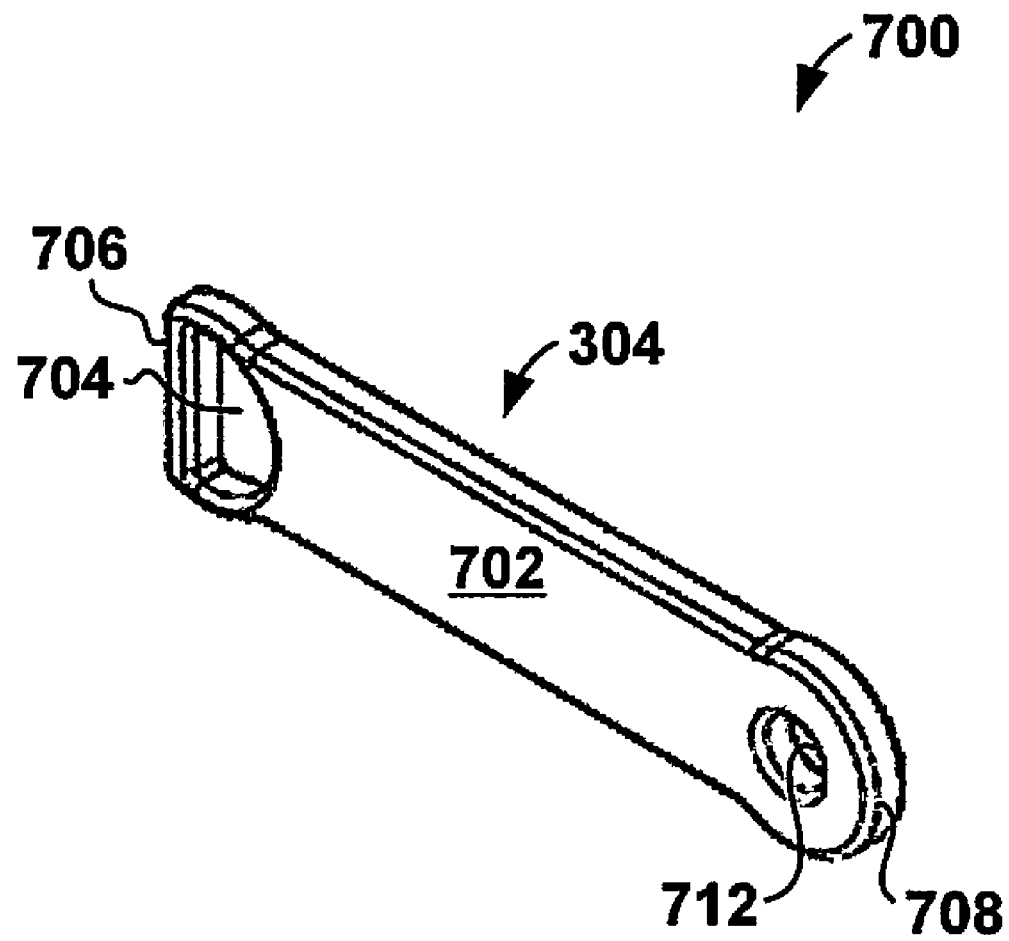
FIG. 7 is a perspective view of a at least one holding member according to another embodiment of the invention.

An at least one holding member 304 illustrated in FIG. 7 in one embodiment 700 comprises an holding member 702 in communication with and a part of a holding member first opening 704 with a flat end surface 706 at one end of the holding member 702, for example and with a holding member second opening 712 and a rounded end surface 708 at the other end of the holding member 702. The elastomeric material comprises: rubber, a silicone elastomer, polydimethylsiloxane, silicone rubber, polyether and the like.

Figure 8:
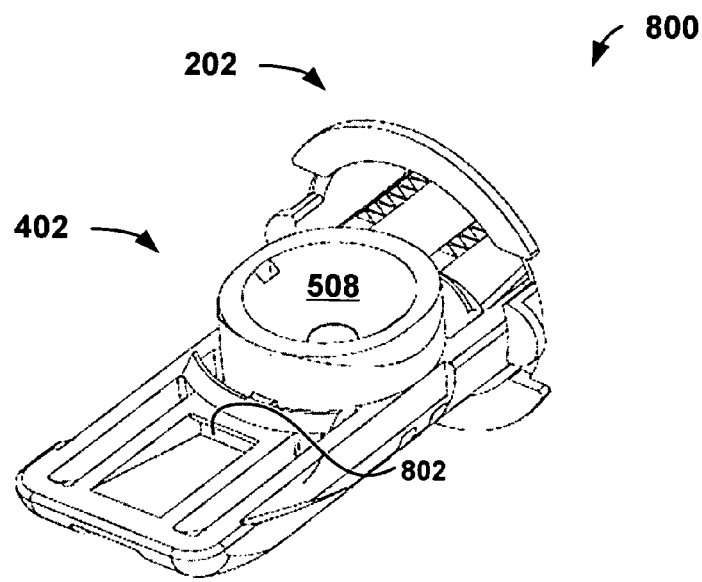
FIG. 8 is a perspective view of an insertion component according to another embodiment of the invention.
Figure 9:
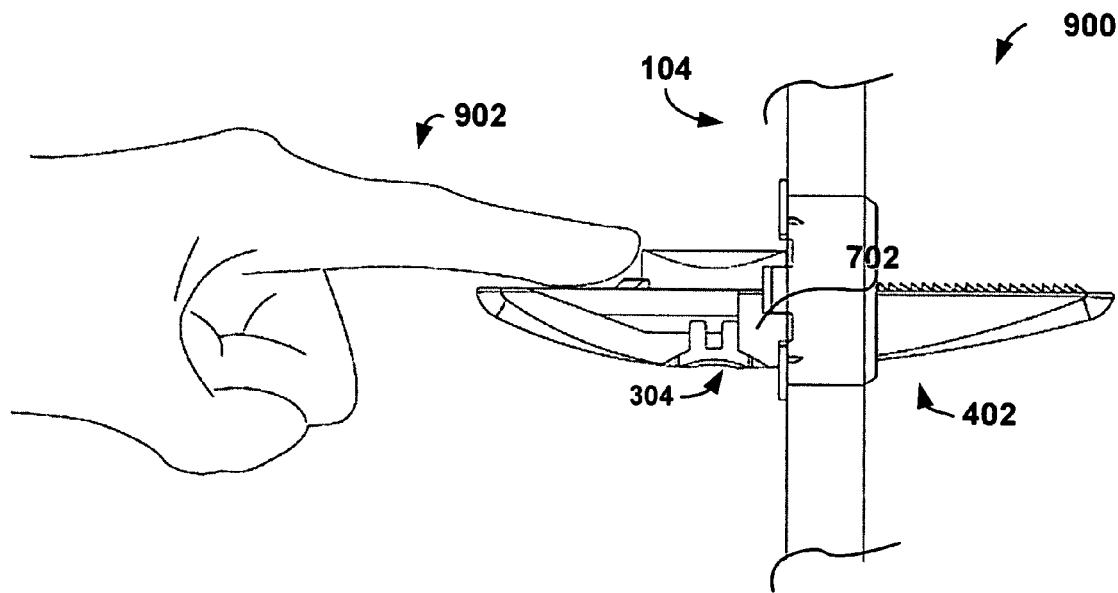
FIG. 9 is a side view of an insertion component and anchor during installation according to another embodiment of the invention.

Turning now to FIGS. 8 and 9, illustrated is an anchor 402 partially introduced into an insertion component 202, with an anchor hub 508 located outside a first panel P1 of a wall W (FIG. 2). The anchor 402 is sized so that it can be inserted completely through the insertion component 202 (FIG. 2). The anchor 402 is non-fixedly attached to the insertion component 202 utilizing at least one holding member 304, as illustrated. The anchor 402 can be inserted utilizing a finger 902 and/or a screwdriver pushing on a screwdriver slot 802, for example.

Figure 10:
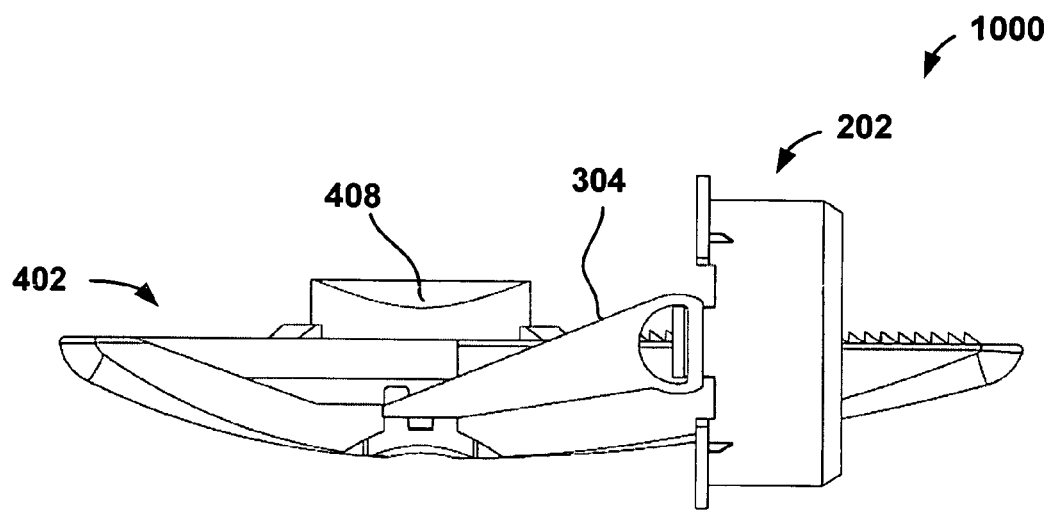
FIG. 10 is a side view of an anchor while initially inserting the anchor through a hole according to another embodiment of the invention.
Figure 11:
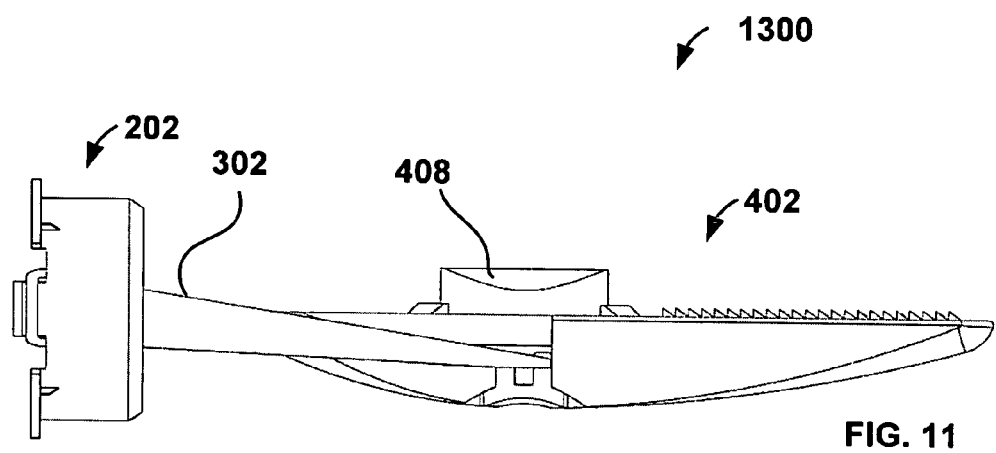
FIG. 11 is a side view of an anchor after inserting the anchor all the way through the hole according to another embodiment of the invention.

Turning now to FIGS. 10 and 11, illustrated as embodiments 1000 and 1100 is an anchor 402 partially introduced into an insertion component 202, with an anchor hub 508 located outside a first panel P1 (not shown) of a wall W (FIG. 2). The anchor 402 is sized so that it can be inserted completely through the insertion component 202. The anchor 402 is non-fixedly attached to the insertion component 202 utilizing at least one holding member 304 stretched in a manner, as illustrated. The anchor 402 can be further inserted utilizing a finger 902 and/or a screwdriver pushing on a screwdriver slot, for example.

Further illustrated as the embodiment 1100 is an anchor 402 fully introduced through an insertion component 202, with an anchor hub 508 located inside a first panel P1 (not shown) of a wall W (FIG. 2). The anchor 402 is sized so that it can be inserted completely through the insertion component 202. The anchor 402 is non-fixedly attached to the insertion component 202 utilizing at least one holding member 304 stretched in a manner, as illustrated.

Figure 12:
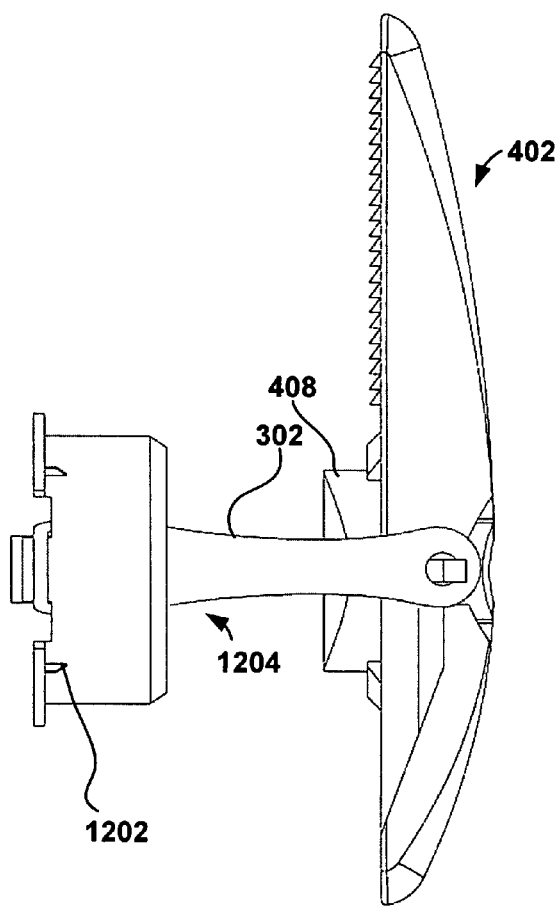
FIG. 12 is a side view of an anchor after rotating the anchor approximately 90 degrees according to another embodiment of the invention.
Figure 13:
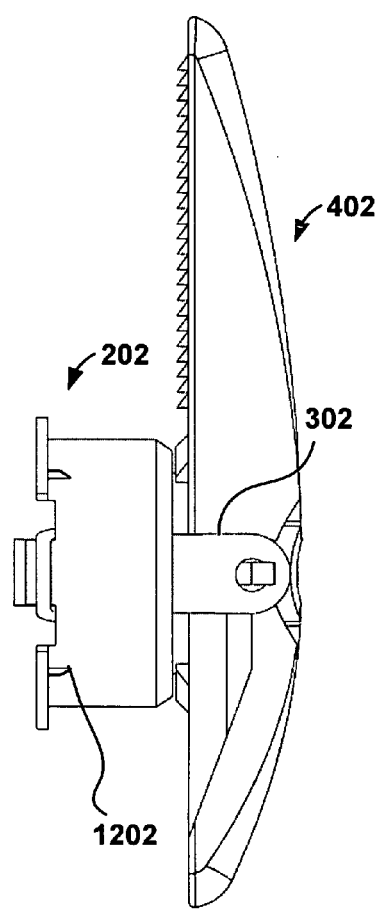
FIG. 13 is a side view of an anchor after inserting the anchor hub into an insertion component according to another embodiment of the invention.
Figure 14:
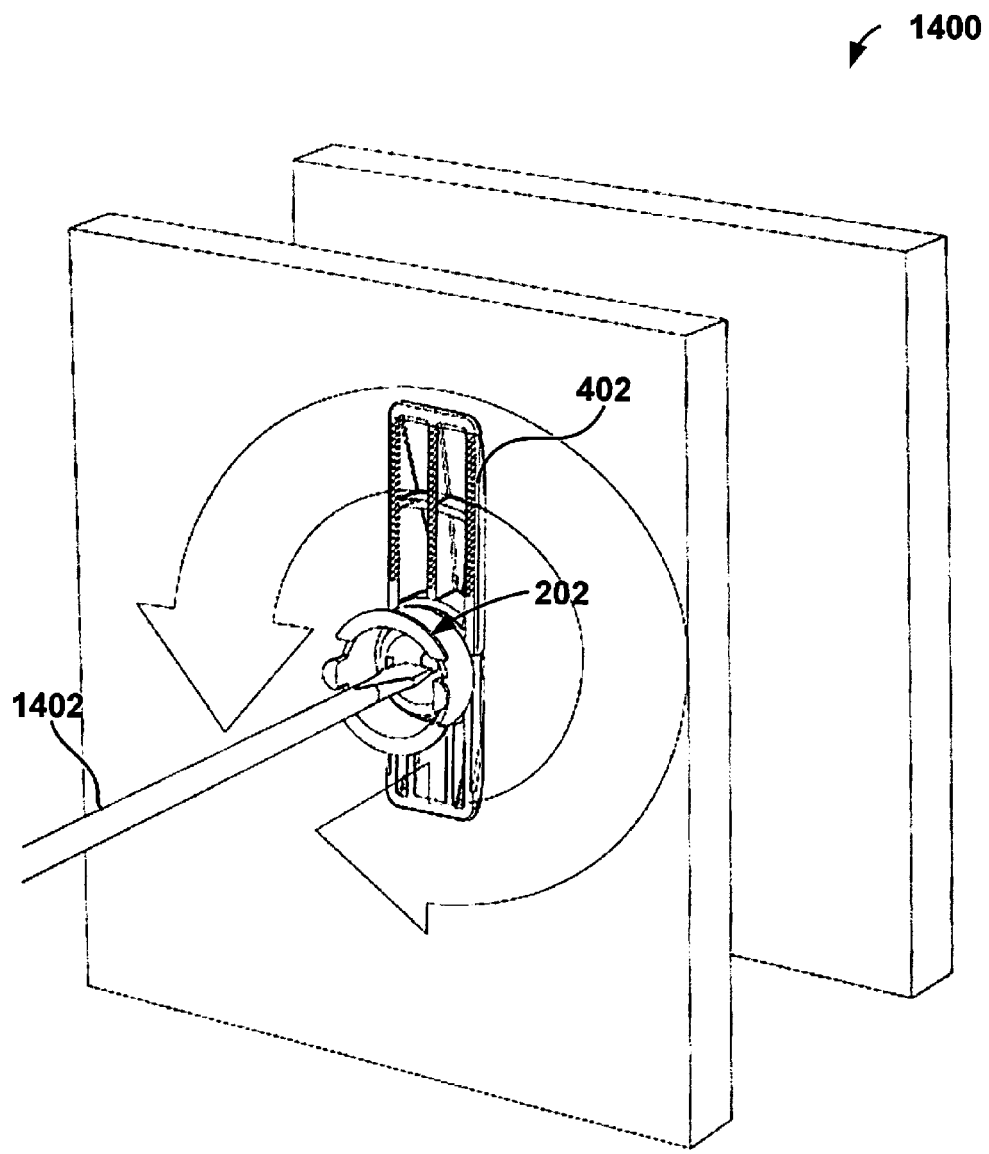
FIG. 14 is a perspective view of an anchor being properly oriented utilizing a screwdriver according to another embodiment of the invention.

As illustrated in FIGS. 12-14 once the anchor 402 is fully inserted through it is rotated in a counterclockwise direction as illustrated in FIG. 12 approximately about 90 degrees so that an anchor planar face 504 is approximately parallel to an inside first panel 218 with at least one holding member 302 in a stretched position and an anchor hub 408 is approximately concentric with an insertion device 202. The anchor 402 illustrated in FIG. 13 is shown wherein the anchor hub 408 enters the insertion device 202. The anchor 402 can be rotated with a screwdriver 1402 wherein the screwdriver 1402 is inserted through the insertion device 202 so that the screwdriver blade engages a hub slot 1404 where the anchor 402 can be rotated into a vertical position.

Figure 15:
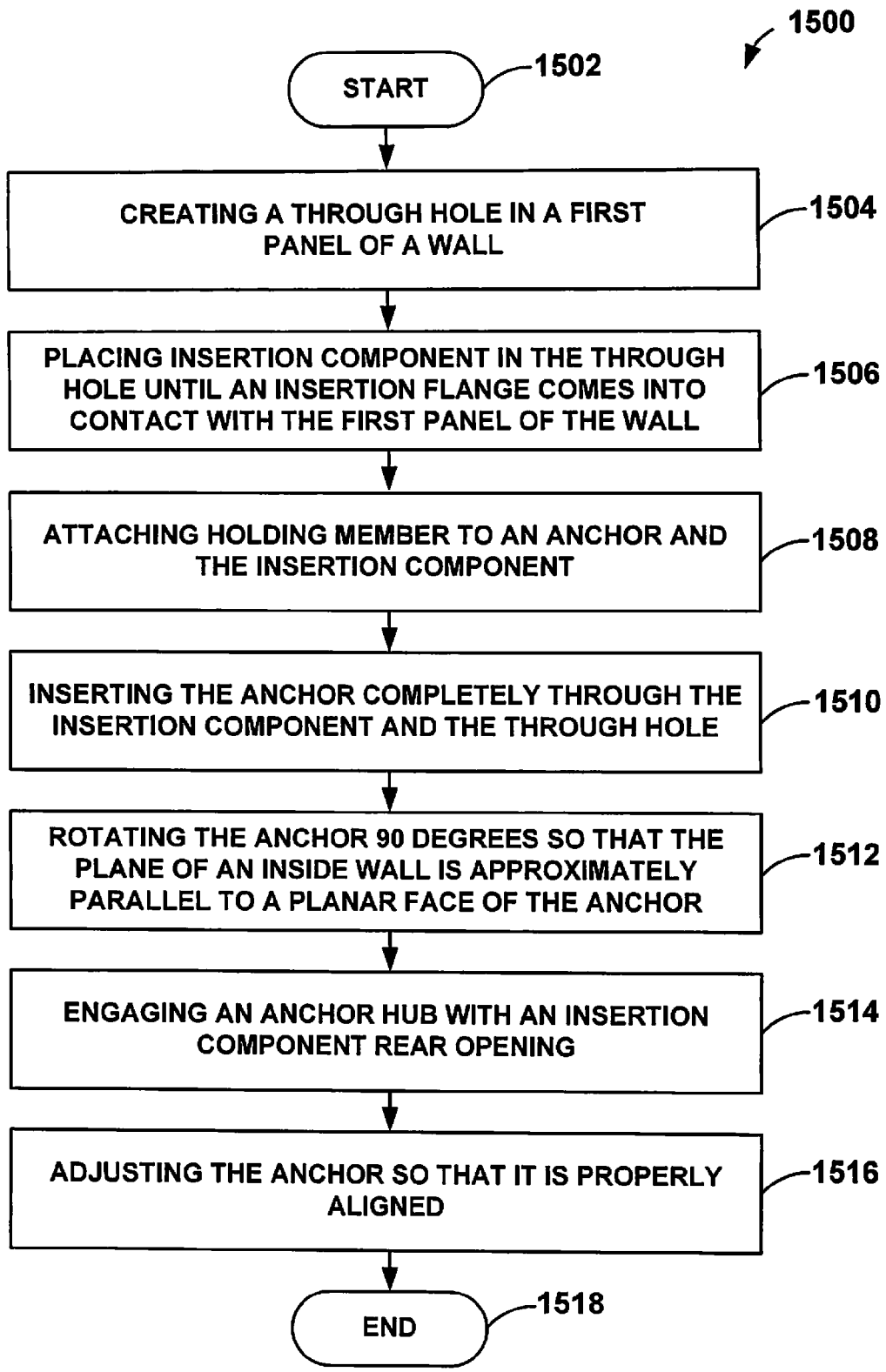
FIG. 15 is a flow diagram illustrating an example of a methodology for installing a wall anchor system in accordance with one or more aspects of the present invention.

In accordance with another aspect of the present invention, FIG. 15 illustrates a method 1500 for creating a wall anchor system. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated and/or described.

As illustrated in FIG. 15, the method 1500 begins at 1502 and at 1504 a through hole 102 is created in a first panel 104 of a wall (FIG. 1). In this embodiment the through hole 102 can be created as a 1¼ inch diameter hole 102 utilizing a 1¼ inch core drill bit (FIG. 1). In one embodiment the first panel comprises tile 104 (FIG. 1) mounted on drywall, for example.

The through hole 102, for example, passes from the outside of panel 1 P1 104, and through a drywall back surface 218.

At 1506 an insertion component 202 (FIGS. 2-3) can be placed in the through hole 102 until an insertion flange 206 comes into contact with the first panel (P1) 104 of the wall (W) of FIG. 2. The insertion component 202 is provided with barbs 1202 (FIGS. 12-13) which help to embed and/or hold the insertion component 202 against the first panel (P1) 104 of the wall (W) of FIG. 2.

At 1508, at least one holding member 304 is attached to both an anchor 402 (FIG. 4) and the insertion component 202. The at least one holding member 304 illustrated in FIG. 7, for example in one embodiment 700 comprises an holding member 702 in communication with and a part of a holding member first opening 704 with a flat end surface 706 at one end of the holding member 702, for example and with a holding member second opening 712 and a rounded end surface 708 at the other end of the holding member 702. The elastomeric material comprises: rubber, a silicone elastomer, polydimethylsiloxane, silicone rubber, polyether and the like. At least one holding member first end 308, for example can be attached to the at least one insertion component tab 204. At least one holding member second end 310, for example is attached to the at least one insertion component 204. As such, the insertion component 202 and the anchor 402 are configured so that they are in constant communication with each other and the anchor 402 can be inserted though an insertion component opening 306 all the way through the through hole 102 into a wall space WS so that an anchor planar face 510 (FIG. 5) can be rotated toward a first panel inside surface 218. The inventor recognized that by using the insertion component 202 that did not pass all the way through the through hole 102 the insertion component 202 would not come into contact with fiberglass (not shown) between the first panel P1 and the second panel P2.

At 1510 the anchor 402 is inserted through the insertion component 202 and a through hole 102. Further illustrated as embodiment 1100 is an anchor 402 fully introduced through an insertion component 202, with an anchor hub 508 located inside a first panel P1 (not shown) of a wall W (FIG. 2). The anchor 402 is sized so that it can be inserted completely through the insertion component 202. The anchor 402 is non-fixedly attached to the insertion component 202 utilizing at least one holding member 304 stretched in a manner, as illustrated.

At 1512 the anchor 402 is rotated approximately 90 degrees so that a first plane P1 outside wall 218 is approximately parallel to a planar face 504 of the anchor 402. At 1514 an anchor hub 508 is engaged with an insertion component rear opening 1204. At 1516 the anchor is aligned so that it is properly aligned with the wall w and at 1518 the method ends.

Although the invention has been illustrated and described with respect to one or more embodiments, implementations, alterations and/or modifications may be made to the illustrated examples without departing from the spirit and scope of the appended claims. In particular regard to the various functions performed by the above described components or structures (assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A mounting system, comprising:
   an insertion component configured to be partially inserted into but not through a hole in a first panel of a wall assembly, the insertion component comprising an opening;
   an elongated anchor having a hub and at least one anchor tab; and
   an elastic holding member configured to connect the insertion component and the anchor;
   wherein the anchor located on a first side of a first panel is configured to be inserted through the insertion component opening; and
   wherein the holding member pulls the insertion component and the anchor toward each other on opposite sides of the first panel and separated by approximately a first panel thickness.

2. The mounting system of claim 1, wherein the anchor is a material comprising: PVC, ABS, reinforced plastic, a polymer, aluminum, metal and polyethylene.

3. The mounting system of claim 1, wherein the holding member comprises an elastomeric material, rubber, a polymer, an elastomeric composite and an elastomeric device.

4. The mounting system of claim 1, wherein the insertion component comprises at least one insertion component tab for non-fixedly attaching to a holding member first end opening.

5. The mounting system of claim 1, wherein the at least one anchor tab attaches to a holding member second end opening.

6. The mounting system of claim 1, wherein the insertion component includes a leading end and a trailing end, at least one wall stop flange and an insertion flange which defines a through hole and is configured to be inserted partially into the hole in the first panel.

7. A mounting system, comprising:
   an insertion component having an insertion flange, a wall stop and at least one insertion component tab, the insertion component comprising an opening;
   an anchor having a hub and at least one tab wherein the opening of the insertion component is sized such that the entire anchor is passable through the opening; and
   at least one elastomeric holding member coupling together the insertion component and the anchor, the at least one flexible holding member comprising a first end opening attached to the at least one tab and a second end opening attached to the at least one insertion component tab;
   wherein the at least one holding member applies a force for maintaining the position of the insertion component relative to the anchor when the insertion component and the anchor are on opposite sides of a first panel.

8. The mounting system of claim 7, wherein the system provides two elastomeric holding members configured to provide redundancy to connect and pull the insertion component and the anchor toward each other until the insertion component wall stop flange and the anchor planar face are separated by approximately a first panel thickness.

9. The mounting system of claim 7, wherein a placement of a marking of the insertion component indicates the anchor is vertical.

10. The mounting system of claim 7, wherein the system is configured to only require one hand to securely insert and retain the anchor when the anchor is inserted through the insertion component and the through hole and the anchor front face plane is located approximately parallel to and approximately in contact with first panel inside surface.

11. The mounting system of claim 7, wherein the system does not require any user intervention to apply force between the insertion component and the anchor when the insertion component and the anchor are on opposite sides of a first panel.

12. The mounting system of claim 7, wherein the elastomeric holding member is non-fixedly attached to the at least one tab.

13. The mounting system of claim 7, wherein the elastomeric holding member is fixedly attached to the at least one tab.

* * * * *

UNITED STATES PATENT AND TRADEMARK OFFICE
CERTIFICATE OF CORRECTION

PATENT NO. : 8,388,290 B2
APPLICATION NO. : 12/640596
DATED : March 5, 2013
INVENTOR(S) : Matthew Wiggins et al.

It is certified that error appears in the above-identified patent and that said Letters Patent is hereby corrected as shown below:

In the Specifications:

Column 3, Line 38
"comprises an drywall" should read "comprises a drywall"

Column 4, Line 64
"comprises an holding" should read "comprises a holding"

Column 6, Line 27
"can be inserted though" should read "can be inserted through"

Signed and Sealed this
Seventh Day of May, 2013

Teresa Stanek Rea
*Acting Director of the United States Patent and Trademark Office*